United States Patent

Hulsizer

[19]

[11] Patent Number: 6,013,890
[45] Date of Patent: Jan. 11, 2000

[54] DUAL PASS WELD OVERLAY METHOD AND APPARATUS

[75] Inventor: Philip N. Hulsizer, Atlanta, Ga.

[73] Assignee: Welding Services, Inc., Norcross, Ga.

[21] Appl. No.: 08/954,555

[22] Filed: Oct. 20, 1997

[51] Int. Cl.[7] .................................................. B23K 9/04
[52] U.S. Cl. ................................... 219/76.14; 219/125.11
[58] Field of Search ........................... 219/76.14, 125.11, 219/137 PS, 137 R, 74, 75, 76.12, 73.2, 76.15

[56] References Cited

U.S. PATENT DOCUMENTS

| | | | |
|---|---|---|---|
| 2,299,747 | 10/1942 | Harter | 219/76.12 |
| 2,427,350 | 9/1947 | Carpenter et al. | 219/73.2 |
| 2,756,311 | 7/1956 | Persson et al. | 219/74 |
| 2,868,954 | 1/1959 | Skinner et al. | 219/137 R |
| 3,139,511 | 6/1964 | Kudelko | 219/137 R |
| 3,549,857 | 12/1970 | Needham et al. | 219/137 PS |
| 4,948,936 | 8/1990 | Landry | 219/76.14 |

FOREIGN PATENT DOCUMENTS

| | | | |
|---|---|---|---|
| 55-73479 | 6/1980 | Japan | 219/75 |
| 55-84276 | 6/1980 | Japan | 219/75 |
| 59-110474 | 6/1984 | Japan | 219/75 |

*Primary Examiner*—Clifford C. Shaw
*Attorney, Agent, or Firm*—Jones & Askew, LLP

[57] ABSTRACT

A method is disclosed for applying a weld overlay to a tube. Using a first weld head, a bead of overlay material is applied onto a tube by melting the overlay material. In the process of applying the weld bead to the tube, a heat affected zone is created within the tube. Thereafter, a second weld head is employed to apply sufficient heat to the exterior of the tube to raise the temperature within the heat-affected zone to a temperature higher than its tempering temperature but lower than its Ae1 temperature. In this manner the heat affected zone is eliminated without creating a new heat affected zone in the process.

In the disclosed embodiment, the tube is rotated with respect to the weld heads, while the weld heads move along the longitudinal axis of the tube. According to the disclosed embodiment, the first weld head employs a gas-metal arc welding process, and the second weld head employs a gas-tungsten arc welding process.

16 Claims, 3 Drawing Sheets

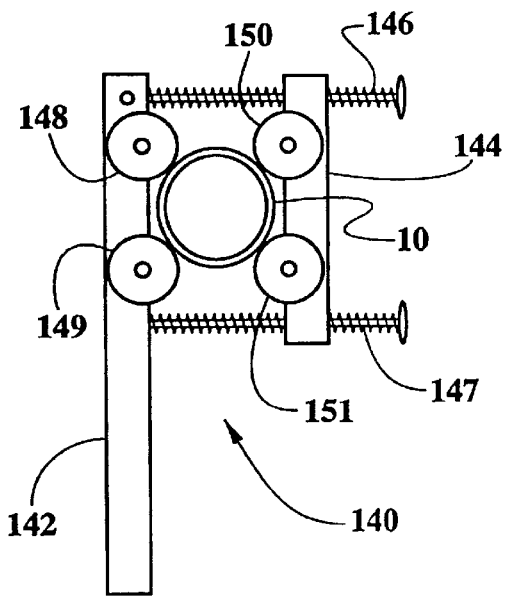
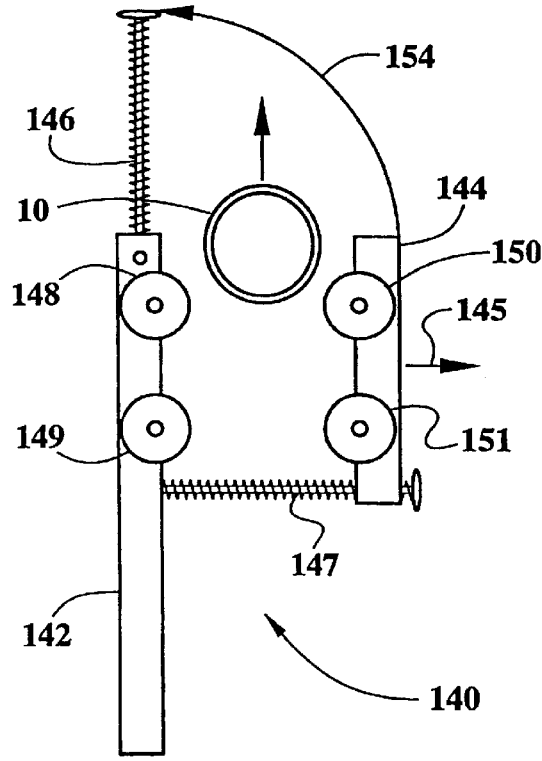
*Fig. 3A*  *Fig. 3B*
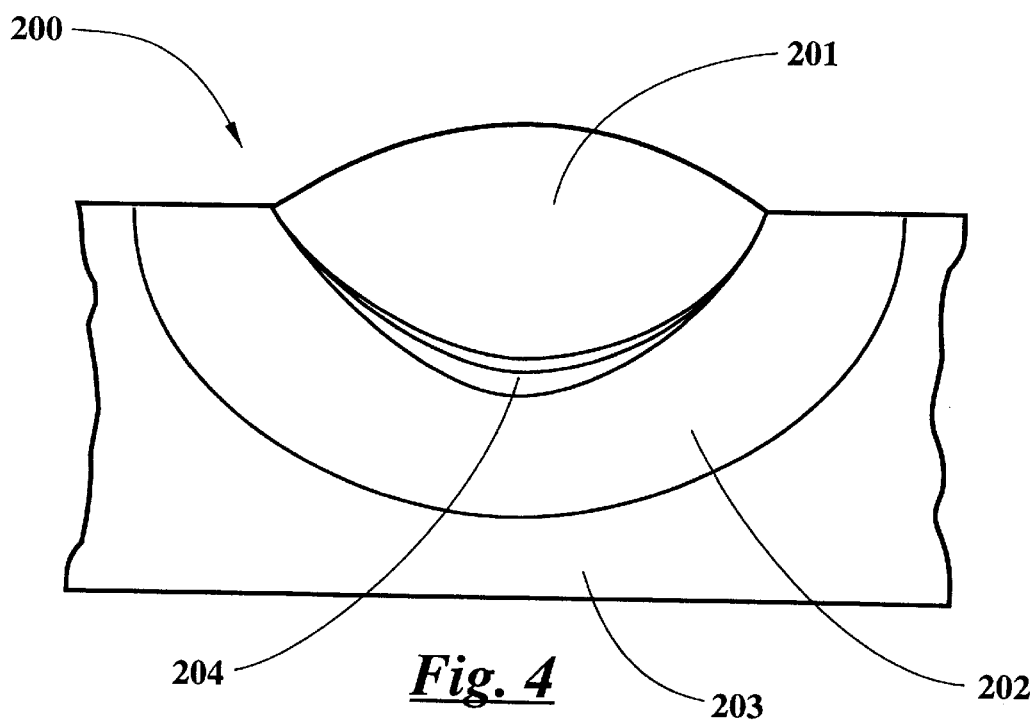
*Fig. 4*

DUAL PASS WELD OVERLAY METHOD AND APPARATUS

TECHNICAL FIELD

The present invention relates to a method and apparatus for overlaying metal tubing. More specifically, the invention relates to a method and apparatus which employs two separate welding processes in a single pass to overlay conventional tube stock.

BACKGROUND OF THE INVENTION

When selecting metal tubing for a particular application, the demands of the application may require physical characteristics which cannot be met by a single composition. Some alloys, for example, may provide suitable characteristics in terms of mechanical properties but lack the necessary resistance to corrosion, abrasion, or both. Other alloys may provide suitable performance in resisting corrosion and abrasion but lack the requisite structural characteristics.

In such an instance, the solution is normally found in overlaying a tubing having the requisite structural characteristics with an alloy having the desired resistance to corrosion and abrasion. Such composite tubing is typically manufactured in either of two ways: by co-extruding the two compositions during the manufacturing process or by applying a weld overlay to a pre-existing metal tube. The present invention is concerned with the latter approach.

An optimal weld overlay has several characteristics. First, the weld penetration of the tube stock is carefully controlled to ensure the optimum fusion between the weld overlay and the tube stock. Second, the exterior surface of the weld overlay will be smooth. Third, the thickness of the weld overlay and the resulting dimensions of the overlayed tube can be closely controlled. Unfortunately, using conventional weld overlay techniques, these characteristics tend to be mutually exclusive, and the weld overlay is at best a compromise. If the voltage and current of the weld head are controlled to provide the smoothest possible exterior surface, then penetration of the tube stock tends to be excessive and uneven. Stresses resulting from bending of the tube or from thermal cycling can cause the weld overlay to separate from the underlying tube stock. On the other hand, if the voltage and current of the weld head are controlled to optimize penetration, then the exterior surface of the weld overlay tends to be rough and uneven. A rough, uneven exterior surface of a weld overlay suffers numerous disadvantages. It can make the tube more difficult to bend, which can result in an uneven distribution of stresses during bending and thermal cycling. It can also affect the thickness of the weld overlay and the resulting dimensions of the overlayed tube. When the tubes are used to fabricate a tube panel, adjacent tubes with uneven surfaces can create undesirable gaps between the tubes.

In addition, conventional weld overlay processes create what is known as a heat-affected zone, that is, a zone within the pipe which is created by the metal of the pipe being heated to a temperature higher than its Ae1 temperature but less than its melting temperature. The base metal within the heat affected zone undergoes phase, microstructure, and grain growth changes which can cause the pipe to be brittle, such that the composite pipe is difficult to bend without cracking. Furthermore, this transformation results in residual stresses being formed within the pipe.

Thus, there is a need for a weld overlay process and article of manufacture which provides optimum penetration of the underlying tube stock and a smooth, even exterior surface.

There is a further need for a weld overlay process and article of manufacture which can provide optimum penetration of the underlying tube stock and a smooth, even exterior surface and also control over the thickness of the overlay and the resulting dimensions of the overlayed tube.

There is still a further need for a weld overlay process and article of manufacture which can provide optimum penetration of the underlying tube stock and a smooth, even exterior surface and also provide uniform residual stresses within the overlayed tube.

There is yet another need for an overlayed tube which exhibits improved metallurgical characteristics of the base metal within the HAZ

SUMMARY OF THE INVENTION

Stated generally, the present invention comprises a process for applying a weld overlay to a tube. Using a first welding process, a bead of overlay material is applied onto a tube by melting and transferring the overlay material. In a disclosed embodiment this heating is accomplished by a metal-inert gas welding process, more specifically a pulse spray transfer. When a portion of the bead solidifies, that portion is re-heated using a second welding process. In a disclosed embodiment this re-heating is accomplished by a tungsten-inert gas welding process. In the disclosed embodiment, the tube is rotated with respect to the weld heads, while the weld heads move along the longitudinal axis of the tube. According to the disclosed embodiment, the first weld head employs a gas-metal arc welding process, and the second weld head employs a gas-tungsten arc welding process.

According to one aspect of the process, the second weld head is controlled to apply an amount of heat to the weld which will elevate the temperature within the heat affected zone to a level sufficient to temper the metal within the heat-affected zone, without raising the temperature in the adjacent region to a temperature higher than its Ae1 temperature. This process step eliminates the heat affected zone without creating a new heat affected zone, thereby improving the metallurgy of the base metal within the heat affected zone In a second aspect the present invention comprises an apparatus for applying a weld overlay to a metal tube. A frame supports tube for rotation about its longitudinal axis. A movable support adjustably supports first and second weld heads and is configured to move the weld heads along the longitudinal axis of the tube. The weld heads are adjustably supported on the movable support in predetermined relation to the tube. A weld overlay material feeder is operatively associated with the first weld head and, in conjunction with the first weld head, applies a weld overlay to an exterior surface of the tube.

Thus it is an object of the present invention to provide an improved method and apparatus for applying a weld overlay onto a tube.

It is another object of the present invention to provide an improved method and apparatus for applying a weld overlay onto a tube wherein the procedure both optimizes the penetration of the tube material and provides a smooth, even exterior surface.

Still another object of the present invention is to provide an improved method and apparatus for applying a weld overlay onto a tube wherein the procedure both optimizes the penetration of the tube material and provides a smooth, even exterior surface while also providing control over the thickness of the overlay and the resulting dimensions of the overlayed tube.

It is yet another object of the present invention to provide a weld overlay process and article of manufacture which can provide optimum penetration of the underlying tube stock and a smooth, even exterior surface and also provide uniform residual stresses within the overlayed tube.

Another object of the present invention is to provide a process and apparatus which improves the metallurgy of the composite pipe.

Still another object of the present invention is to provide a process and apparatus which eliminates the heat affected zone within the pipe.

Other objects, features, and advantages of the present invention will become apparent upon reading the following specification, when taken in conjunction with the drawings and the appended claims.

BRIEF DESCRIPTION OF THE DRAWINGS

FIG. 3A is an elevation view of a tube support of the apparatus of FIG. 2 with the support shown in its normal, closed position; FIG. 3B is an elevation view of the tube support of FIG. 3A showing the support in its open position for accepting a metal tube therewithin.

FIG. 4 is a schematic view of a pipe with a weld overlay as seen in longitudinal cross-section.

DETAILED DESCRIPTION OF THE DISCLOSED EMBODIMENT

Figure 1:
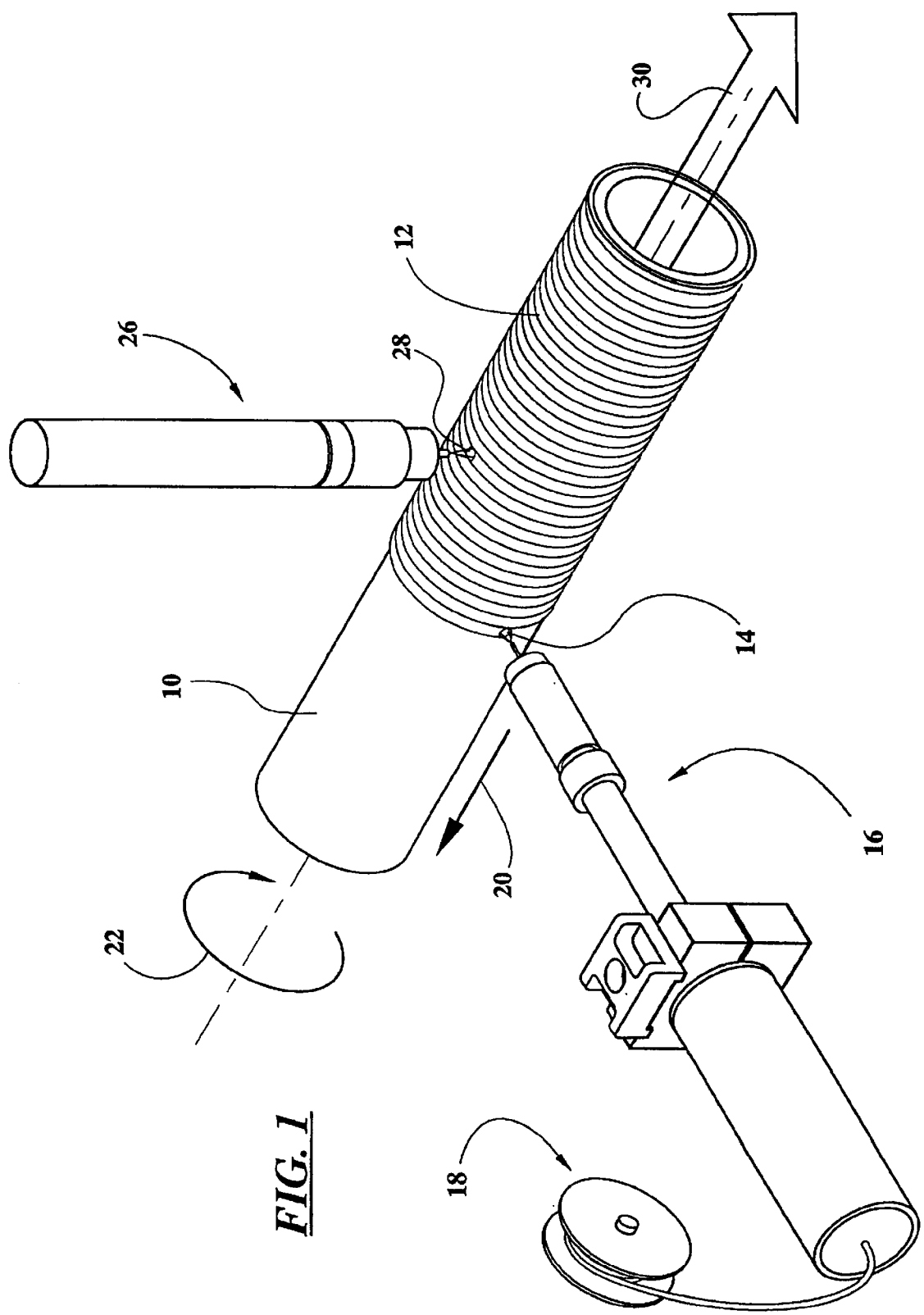
FIG. 1 is a schematic diagram illustrating a method of applying a weld metal overlay onto a metal tube, according to the present invention.

Referring now in more detail to the drawings, in which like numerals indicate like elements throughout the several views, FIG. 1 illustrates a method of applying to a metal tube stock 10 a weld metal overlay 12. Typical examples of suitable material for the tube stock 10 would include carbon or low alloy steel. Examples of suitable weld overlay material include alloy 309 and alloy 625. However, it will be appreciated that the method and apparatus disclosed hereinbelow are equally suitable for other tube stock materials and other weld overlay materials depending upon the characteristics desired of the finished product and subject to the limitations of compatibility to the tube stock material and the weld overlay material.

The weld overlay is applied at a first location 14 by a gas metal arc welding ("GMAW") torch or weld head, also known as a metal inert gas ("MIG") torch. A wire feeder 18 is associated with the MIG torch 16 to feed a metal overlay material to the weld location 14. In the disclosed embodiment, the MIG torch 16 is of conventional design and is the model A2521-3072T4 manufactured by Bernard. The associated wire feed 18 is also of conventional design and, in the disclosed embodiment, is the model 554D, manufactured by Miller.

The MIG torch 16 in the disclosed embodiment is longitudinally advanced past the weld head in the direction indicated by the arrow 20, while the tube stock 10 is simultaneously rotated past the torch in the direction indicated by the arrow 22. When viewed from the right end of the tube stock 10 as shown in FIG. 1, such that the tube stock rotates in a clockwise direction, the MIG torch 16 applies the weld overlay at a location corresponding to approximately the nine o'clock position on the outer circumference of the tube stock. This location is advantageous because applying the weld metal overlay material to the tube stock in a vertical position minimizes dilution of the base metal and weld wire. The MIG weld head 16 oscillates in a direction parallel to the longitudinal axis of the tube stock 10 (in the same direction previously indicated by the arrow 20) to work the weld bead further.

A gas tungsten arc welding ("GTAW") torch, also known as a tungsten inert gas ("TIG") torch or weld head 26, is disposed to treat the weld metal overlay 12 at a point which is spaced apart from the MIG torch 16 along the longitudinal access of the tube stock 10. In the disclosed embodiment, the TIG torch 26 is of conventional design and is the model WP17 manufactured by Weld Craft. Again as viewed from the right end of the tube stock 10 as shown in FIG. 1, with the tube stock rotating in a clockwise direction, the TIG torch 26 heats the weld metal overlay 12 at a location substantially corresponding to the twelve o'clock position on the circumference of the tube stock 10. No wire feed is associated with the TIG torch 26, and no additional weld metal overlay material is applied to the circumference of the tube stock 10 at the location 28 which is heated by the TIG weld head 26.

The current and voltage of the MIG weld head 16 are controlled to optimize fusion between the weld overlay 12 and the tube stock 10. The resulting weld overlay will tend to have a rough, uneven surface. The current and voltage of the TIG weld head 26 are then controlled to melt or to "wash" and to re-shape the outer portion of the weld bead. The re-heating process achieved by the TIG weld head 26 advantageously does not re-melt the entire weld bead. Instead, the weld bead is heated to a temperature sufficient to melt only a portion of the weld bead but not sufficient to increase dilution of the weld metal or to increase penetration into the base metal.

The use of two separate weld heads 16, 26 with weld metal overlay material being applied only in conjunction with the first weld head 16 provides the following advantages. The voltage, amperage, and wire feed rate of the MIG weld head 16 can be controlled to optimize penetration of the weld bead without regard to the effect on the outer circumference of the bead. In contrast, the voltage and amperage of the TIG weld head can be controlled to provide fine contouring to the circumference of the weld overlay material 12. In addition, the second heating process accomplished by the TIG weld head 26 provides for uniform residual stresses in the weld bead and lowers the hardness of the heat-affected zone by as much as 8–10 points on the Rockwell "C" scale.

To control the temperature of the tube stock and to control the rate of cooling of the weld overlay metal, water is flowed through the tube stock during the welding process, as indicated generally by the arrow 30. The volume and flow rate of the water are sufficient to maintain this tube stock at an interior temperature of 80–100° F.

Figure 2:
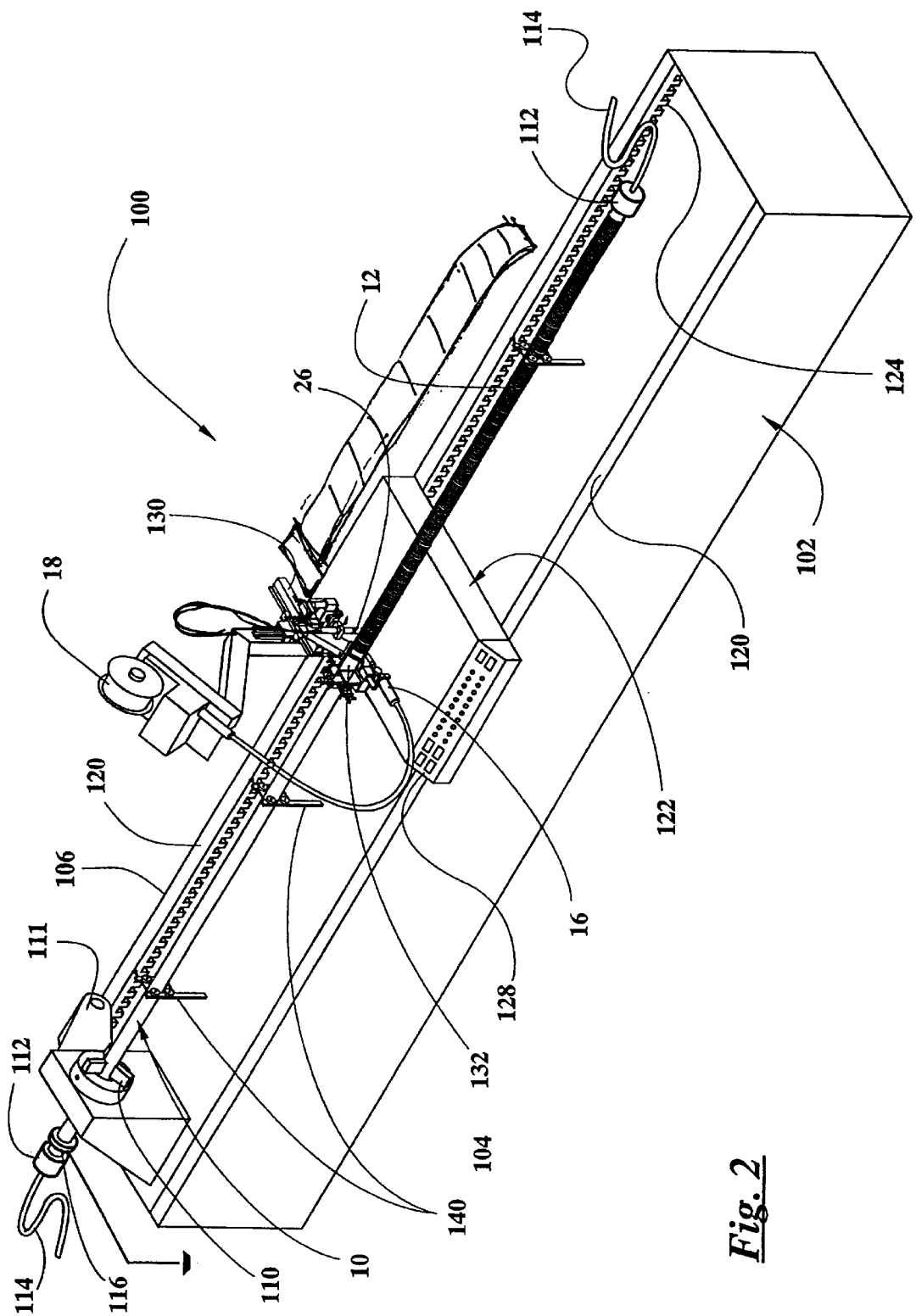
FIG. 2 is a perspective view of an apparatus for performing the method of FIG. 1.

FIG. 2 illustrates an apparatus 100 for carrying out the method illustrated in FIG. 1. The apparatus 100 includes an elongated frame 102 having side walls 104 and 106. One end of the tube stock 10 is gripped in a chuck 110 which is rotationally driven by an electric motor or other suitable means 111. Rotary unions 112 cap each end of the tube stock 10, and hoses 114 coupled to the rotary unions 112 introduce a coolant such as water into one end of the tube stock 10 and withdraw it from the other. A rotary ground 116 grounds the tube stock 10.

The frame 102 further comprises upper rails 120 disposed along the upper edge of each of the side walls 104, 106. A wheeled platform 122 rolls along the rails 120. Gears (not shown) operatively associated with the platform 122 and driven by an electric motor or other suitable means engage a gear rack 124 formed along the lower surface of each of the upper rails 120 to move the platform 122 along the length of the frame 102.

The platform 122 includes a control panel 128 by which the voltage, current, and speed of oscillation of the two weld heads 16, 26, the wire feed speed of the wire feeder 18, and the speed of movement of the platform 122 are set.

When mounted to the frame 102 as thus described, the tube stock 10 extends over the platform 122. The MIG weld head 16, wire feed 18, and TIG weld head 26 are adjustably mounted to the platform 122 by a suitable mounting means 130 so that they can be properly oriented with respect to the tube stock 10. Affixed to the mounting means 130 is a guide 132 in the form of a short length of aluminum structural angle disposed in an inverted "V" position. The guide 132 rides on top of the tube stock 10 to maintain the proper relationship between the tube stock and the mounting means 130. The platform 122 moves along the frame 102 to effect relative longitudinal movement between the weld heads 16, 26 and the tube stock 10. Simultaneously the tube stock 10 rotates to effect relative rotational movement between the tube stock and the weld heads 16, 26. The speed at which the platform 122 moves along the rails 120 of the frame 102 is controlled with respect to the speed at which the tube 10 is rotated so that the weld heads 16, 26 have advanced by a distance corresponding to the width of the weld bead 12 for each rotation of the tube.

To support the weight of the tube stock 10 along its length, a plurality of supports 140 are provided. As can be seen in FIG. 3, each support 140 includes an upright stanchion 142. A frame 144 is mounted to the stanchion 142 for movement toward and away from the stanchion in the direction indicated by the arrow 145. In the disclosed embodiment, movement of the frame 144 toward and away from the stanchion 142 is affected by a pair of threaded rods 146, 147, though other suitable mechanisms may be used. The support further includes upper and lower wheels 148, 149 rotatably mounted to the stanchion 142 and upper and lower wheels 150, 151 rotatably mounted to the frame 144.

As can be seen in FIG. 3B, the upper threaded rod 146 is disengageable from the frame 144 and pivotably opens as indicated by the arrow 154 to permit the support 140 to be positioned around the tube stock 10. The frame 144 is then closed by turning the threaded rods 146, 147 to bring the upper and lower wheels 148–151 into contact with the outer circumference of the tube stock 10. The spacing between the frame 144 and the stanchion 142 is adjusted to bring all four wheels 148–151 into contact with the circumference of the tube stock. As the tube stock 10 is rotatably driven, the wheels 148–151 rotate freely to permit the tube stock to rotate within the support 140.

At the start of the weld overlay process, the platform 122 is located at the far right end of the frame 102 as seen in FIG. 2. The three supports 140 are spaced along the length of the tube stock 10 to the left of the platform, as seen in FIG. 2, to support the weight of the tube stock.

As the platform 122 moves along the frame 102 toward the left, the rightmost support 140 is removed and repositioned to the right of the platform. As the platform 122 moves further toward the left, the next support 140 is moved out of the way and repositioned to the right of the platform. Similarly, as the platform 122 continues to move, the last support 140 is repositioned to a location on the right side of the platform as seen in FIG. 2.

There may be occasions when it would be desirable to apply a second weld metal overlay on top of the first weld metal overlay 12. As an example, whenever a weld overlay is applied directly onto the exterior surface of a tube, some dilution of the weld metal occurs. Application of a second weld overlay provides an outer layer which is virtually pure weld metal. When applying two weld overlays, it may be desirable to use a less-expensive metal such as alloy 304 for the bottom layer and a weld metal having more of the desired chemistry and physical properties for the top layer, such as alloy 309. In such a case, the TIG weld head 26 would be moved further away from the MIG weld head 16, and a second MIG weld head with associated wire feed would be positioned between the first MIG weld head 16 and the TIG weld head 26. A first weld metal overlay 12 would be applied onto the tube stock 10 as previously described. At a point sufficiently spaced apart from the first MIG weld head 16 that the first weld metal overlay 12 has solidified, a second weld metal overlay is applied by the second MIG weld head and associated wire feed. Advantageously the second MIG weld head is also positioned at approximately the 9 o'clock position with respect to the tube stock 10. At a point sufficiently spaced apart from the second MIG weld head that the second weld metal overlay has solified, the TIG weld head 26 heats the second weld metal overlay to provide a smooth, contoured outer surface.

In the disclosed embodiment the MIG weld head 16 and the TIG weld head 26 are spaced apart by five inches along the longitudinal axis of the tube stock 10. The longitudinal spacing of five inches between the MIG and TIG weld heads 16, 26 in the disclosed embodiment is selected because it is not physically possible to position the particular weld heads of the disclosed embodiment any closer together. However, it will be appreciated that, depending upon various factors, a portion of the weld bead 12 may have solidified before the platform 122 has moved five inches. Thus in the case of weld heads having different configurations, it is possible that the two weld heads can be positioned closer together than five inches and still achieve the desired result.

While the embodiment disclosed above employs a platform 122 which moves along the frame 102 to effect relative longitudinal movement between the weld heads 16,26 and the tube stock 10, it will be appreciated that relative longitudinal movement between the weld heads and the tube stock can also be achieved by holding the weld heads steady and moving the tube longitudinally with respect to the weld heads. Thus a means for effecting relative longitudinal movement between the weld heads and the tube could comprise either means for moving the weld heads while the tube remains longitudinally fixed, or means for moving the tube longitudinally with the weld heads remaining fixed.

FIG. 4 is a schematic diagram of a cross-section of a pipe 200 after the first welding pass. The overlaid pipe 200 consists primarily of three zones: the weld 201, the heat-affected zone 202, and the unaffected base metal 203. The boundary between the weld 201 and the heat-affected zone 202 is known as the fusion boundary 204.

As the distance from the fusion boundary 204 increases, the peak temperature to which the base metal is exposed during the first weld pass decreases. The region immediately adjacent the fusion boundary 204 is heated to a temperature sufficient to partially melt the base metal. Beneath this partially melted zone is the heat affected zone (HAZ) 202, which is that portion of the metal which undergoes phase, microstructure, and grain growth changes as a result of being heated to a temperature higher than its Ae1 temperature but less than its melting temperature. In the case of SA-210 steel, the Ae1 temperature is 1333° F., and the melting temperature is approximately 2800° F. The size and location of the HAZ is largely dependent upon the heat input and its location or distance from the fusion boundary.

Because of the microstructural changes of the base metal within the HAZ 202, the metal in the HAZ takes on undesirable metallurgical characteristics. In particular, partial transformation from ferrite and austenite upon heating and bainite and martensite upon cooling makes the metal in the HAZ brittle, such that the composite pipe is difficult to bend without cracking. Furthermore, this transformation results in residual stress formation. It would be desirable to improve the metallurgical characteristics of the base metal within the HAZ 202.

One way of removing residual stresses is to apply sufficient heat to the exterior of the pipe 200 such that the temperature within the HAZ 202 results in tempering of the microstructure. Tempering of the HAZ 202 imparts ductility, refines grain size, and reduces residual stresses caused by the first welding process.

A problem with this approach, however, is that if the base metal within the HAZ 202 is heated to too high a temperature, then the adjacent, previously unaffected base metal 203 will be heated to a temperature higher than its Ae1 and thus create a new HAZ. The HAZ has thus been relocated, not eliminated.

According to the present invention, the second weld pass with the GTAW weld head is controlled to apply sufficient heat to the exterior surface of the weld 201 to cause the temperature within the HAZ 202 to rise to a temperature of between 1000° F. and 1200° F. Upon being heated to a temperature of approximately 1150° F., tempering of the metal within the HAZ occurs. However, by limiting the temperature within the HAZ 202 to a temperature less than the Ae1 temperature, the unaffected base metal 203 adjacent to the HAZ 202 is not heated to a temperature sufficient to cause precipitation. Thus the HAZ 202 is eliminated without creating a new HAZ in the previously unaffected base metal 203.

Obviously, the Ae1 and tempering temperatures are dependent upon the metal comprising the pipe stock. However, for a steel pipe, the HAZ 202 is heated to a temperature of between 1150° F. and 1333° F., a range of temperatures which will temper the HAZ without creating a new HAZ in the process.

A by-product of the second weld pass with the GTAW weld head is that the exterior surface of the weld 201 is heated to a temperature higher than its melting point. Consequently the second weld pass provides the pipe 200 with a smooth, even exterior surface.

Determining the amount of heat to be applied by the GTAW weld head is a straightforward matter of heat transfer principles, easily within the level of ordinary skill in the art. There are many variables for which allowance must be made, including the distance of the HAZ from the exterior surface of the pipe, the metal comprising the pipe, the metal comprising the weld overlay, the thickness of the pipe, the ambient temperature, the temperature and flow rate of the coolant being pumped through the pipe during the welding processes, and other factors. Once the amount of heat to be transferred to the exterior surface of the weld is determined, then other variables relating to the GTAW weld head must be controlled to deliver that amount of heat. Since the speed of the weld head is not variable (it necessarily is the same as the speed of the GMAW weld head, since they are mounted in fixed relation), the voltage and the current must be controlled to deliver the desired amount of heat to the exterior surface of the pipe 201.

Because there are so many variables which must be taken into account, a precise mathmatical formulation for the amount of heat which must be applied by the GTAW weld process is not practical. The following is thus for purposes of example only:

EXAMPLE

Tube stock 10 three inches in diameter is comprised of SA-210 steel. The tube stock 10 is rotated at four to five rotations per minute. Coolant having a temperature of 70–100° F. flows through the tube stock at a rate of 10–30 gallons per minute.

To overlay Alloy 309 stainless steel 0.075 inches thick onto the outer surface of the tube stock 10, the GMAW weld torch 16 operates at a current of 170–220 amps and a voltage of 19–27 volts. The spacing between the first weld head 16 and the second weld head 26 is sufficient to permit the bead applied at any given point by the first weld head to solidify before the second weld head reaches that point. The second weld head, the GTAW weld torch 26, is controlled to apply sufficient heat to the exterior surface of the overlayed tube stock to bring the temperature of the HAZ 202 to a temperature higher than its tempering temperature but lower than its Ae1 temperature. This can be accomplished by operating the GTAW weld torch 26 at a current of 540–600 amps and a voltage of 10–16 volts.

Finally, it will be understood that the preferred embodiment has been disclosed by way of example, and that other modifications may occur to those skilled in the art without departing from the scope and spirit of the appended claims.

What is claimed is:

1. A process for applying a weld overlay to a tube, comprising the steps of:
   using a first weld head, applying a bead of overlay material onto said tube by melting said overlay material, said step of applying a bead of overlay material creating a heat-affected zone within said tube; and
   using a second weld head, applying sufficient heat to said overlaid tube to heat the metal within said heat-affected zone to a temperature higher than its tempering temperature but lower than its Ae1 temperature.

2. The process of claim 1, wherein said process is a continuous process such that said bead of overlay material is being applied onto said tube at a first location simultaneously with said second weld head applying heat at a second location on said tube.

3. The process of claim 1, wherein said first weld head comprises a gas metal arc weld head.

4. The process of claim 1, wherein said second weld head is performed without adding any additional overlay material onto said tube.

5. The process of claim 1, wherein said second weld head comprises a gas tungsten arc weld head.

6. The process of claim 1, wherein said step of applying a bead of overlay material onto a tube comprises the steps of:
   holding a first weld head in a substantially fixed position with respect to said tube;
   rotating said tube about a longitudinal axis to bring successive portions of the outer circumference of said tube beneath said first weld head such that said bead of overlay material is applied onto said successive portions of said outer circumference of said tube; and
   effecting relative longitudinal movement between said first weld head and said tube to apply said bead along the length of said tube.

7. The process of claim 6, wherein said bead of overlay material is applied to said tube at a location on said tube which is at approximately the vertical midpoint of said tube and on a side of said tube which is rotating upward beneath said weld head.

8. The process of claim 6, wherein said step of re-heating said portion of said bead which has solidified comprises the step of holding a second weld head in a substantially fixed position with respect to said tube such that said step of rotating said tube about said longitudinal axis of said tube brings successive portions of the outer circumference of said tube beneath said second weld head.

9. The process of claim 1,
wherein said step of applying said bead of overlay material onto said tube comprises the step of controlling said first weld head to optimize fusion of said weld overlay to said tube without regard to the surface characteristics of the exterior surface of said weld overlay, and
wherein said step of applying sufficient heat to said overlaid tube to heat the metal within said heat-affected zone comprises the step of controlling said second weld head to melt the outer portion of said bead without increasing dilution of the overlay material or increasing dilution of the base metal of the tube.

10. The process of claim 1, wherein said step of applying sufficient heat to said overlaid tube to heat the metal within said heat-affected zone to a temperature higher than its tempering temperature but lower than its Ae1 temperature comprises the step of heating the metal within said heat-affected zone to a temperature of between 1150° F. and 1333° F.

11. The process of claim 1, wherein said step of applying sufficient heat to said overlaid tube to heat the metal within said heat-affected zone to a temperature higher than its tempering temperature but lower than its Ae1 temperature further comprises applying sufficient heat to said bead of overlay material to re-melt said bead of overlay material.

12. The process of claim 1, wherein said second weld head is operated at a current of 540–600 amps and a voltage of 10–16 volts.

13. The process of claim 1, wherein said tube comprises interior and exterior surfaces, and wherein said step of applying sufficient heat to said overlaid tube to heat the metal within said heat-affected zone to a temperature higher than its tempering temperature but lower than its Ae1 temperature comprises the step of heating the exterior surface of said overlaid tube while cooling the interior surface of said overlaid tube to maintain the heat-affected zone at a temperature lower than its Ae1 temperature.

14. The process of claim 13, wherein said step of cooling the interior surface of said overlaid tube comprises the step of flowing a liquid coolant over the interior surface of said overlaid tube.

15. The process of claim 14, wherein said liquid coolant comprises water.

16. The process of claim 14, wherein said step of cooling the interior surface of said overlaid tube to maintain the heat-affected zone at a temperature lower than its Ae1 temperature comprises the step of controlling the temperature and flow rate of said liquid coolant flowing over the interior surface of said overlaid tube so as to maintain the heat-affected zone at a temperature lower than its Ae1 temperature.

* * * * *